United States Patent Office 3,534,029
Patented Oct. 13, 1970

---

3,534,029
PREPARATION INTERMEDIATE PRODUCTS OF CEPHALOSPORINS
Hugo Christiaan Beyerman, Wassenaar, Netherlands, assignor to Organon Inc., West Orange, N.J.
No Drawing. Filed Nov. 14, 1966, Ser. No. 593,719
Claims priority, application Netherlands, Nov. 24, 1965, 6515209
Int. Cl. C07d 93/08
U.S. Cl. 260—243                                        5 Claims

---

ABSTRACT OF THE DISCLOSURE

Heterocyclic intermediates suitable for the preparation of cephalosporins are prepared by reacting an $\alpha$-amino-$\beta$-acylthioalkyl-butenolide with an aldehyde and a Lewis acid to form the corresponding dihydro-thiazine-lactone.

---

The invention relates to a process for the manufacture of new heterocyclic compounds which may be applied for the preparation of cephalosporins.

Cephalosporins are structurally very closely related to penicillins. The characteristic part of the former compounds is the $\beta$-lactam dihydrothiazine ring system (I), while penicillins possess a $\beta$-lactam-thiazoline ring system (II):

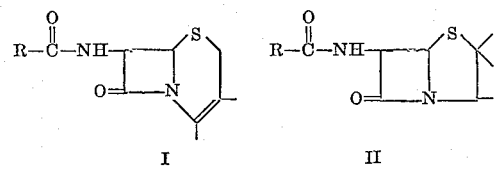

I                    II

Of both these types of antiobiotics a large number of derivatives is known, differing mutually in side-chain R. As regards penicillins, these derivatives can generally be directly prepared microbiologically by adding to the fermentation medium of *Pencillium chrysogenium* the desired side-chain precursor. In the microbioligical preparation of cephalosporins produced by a Cephalosporium species, a compound is obtained, however, with a side-chain derived from D-$\alpha$-amino-adipic acid. As these derivatives are not very active a number of chemical treatments must also be performed after the microbiological production to obtain more active cephalosporin derivatives consisting of the hydrolysis of the microbiologically built-in side-chain and the introduction of a new side-chain. As the microbiological preparation of cephalosporins is in itself much more difficult than that of penicillins and gives a lower yield, and the subsequent conversions are attended with heavy losses, it would of course be most useful if cephalosporins could be prepared synthetically. The importance of this becomes even more manifest if it is considered that cephalosporins possess a very slight toxicity, but are moreover insensitive to Penicillinase. For a great drawback of penicillin compounds is that certain strains of *Staphylococcus aureus*, responsible for all kinds of infections, become resistant against penicillins, because they start producing the enzyme Penicillinase destroying the penicillins.

Although they have now succeeded in preparing penicillins synthetically (J. Am. Chem. Soc. 81, 3089, 1959), all attempts to arrive at a total synthesis of cephalosporins have so far proved fruitless.

In J. Org. Chem., vol. 29, 3560, 1964, E. Galantay et al. propose a synthesis starting from the $\alpha$-amino-$\beta$-mercaptomethyl-$\gamma$-butenolide which, by condensation with a carbonyl compound, could lead to a 3,6-dihydro-(2H)-1,3-thiazine compound, from which a cephalosporin could be prepared, if a suitable carbonyl compound is used. Primary consideration in the synthesis proposed was that the starting product should contain a free SH group, as otherwise no condensation with the carbonyl compound could occur. In the said article Galantay et al. describe some attempts to arrive at the said starting product, which attempts failed, because it proved to be impossible to remove the SH protecting groups without oxidation of the SH compound formed in it.

Surprisingly it has now been found that the conversion proposed by Galantay does not necessarily require a free SH compound, but that condensation may occur between a carbonyl compound and the relative S Acyl compound, if the reaction is performed in the presence of a Lewis acid.

Hence the invention relates to the preparation of novel heterocyclic compounds which may be applied as a starting product for the preparation of cephalosporins, consisting in that a compound of the formula:

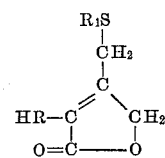

in which:

$R_1$=lower alkanoyl, and
R=O, NH or N-lower alkanoyl.

is reacted with an aldehyde

in the presence of a Lewis acid, leading to the compounds of the formula:

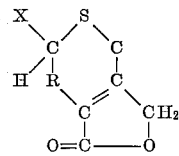

in which:

X=a lower alkyl, phenyl, lower alkylphenyl, chlorophenyl or phthalimidomalonyl, and
R=O, NH or N-lower alkanoyl.

The $\gamma$-butyrolactone ring system occurring in the starting product is at the same time a part of the cephalsoporin-C. This lactone system may be converted into the $\alpha$-carboxyl-$\beta$-acetoxymethylene system occurring in Cephalosporin-C, and vice versa (see J. Am. Chem. 84, 3401, 1962).

The reaction according to the invention proceeds probably in such a way that first a complex is formed between the aldehyde and the Lewis acid, which reacts subsequently with the thiol ester via a concerted mechanism according to the following reaction scheme, in which as Lewis acid the $BF_3$ has been used and as thiol ester the thiol acetate:

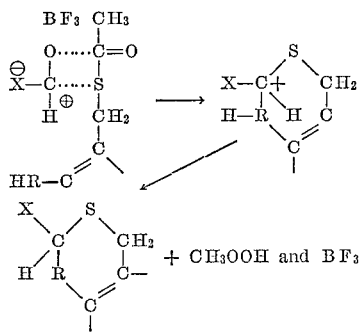

In principle the reaction may be performed with any aldehyde, but in order to make the building up of the amino-substituted $\beta$-lactam system occurring in cephalosporins possible an aldehyde must be used of the general formula:

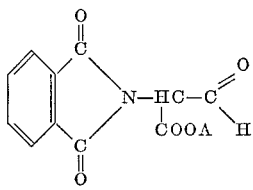

in which A represents a hydrocarbon radical, usually an aliphatic hydrocarbon radical, such as a t.butyl group.

The compounds indicated above usually possess an N-protecting group known from synthetic peptide chemistry.

An aldehyde preferably used in the phthalimidomalonaldehydate ester of the formula:

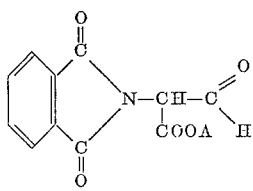

The Lewis acid to be applied in the process according to the invention is preferably $BF_3$, usually in the form of the etherate, but other Lewis acids, too, may be applied, such as $AlCl_3$, $ZnCl_2$, $FeCl_3$, $AlBr_3$, or $AsCl_3$.

The products obtained in the process according to the invention may be converted into cephalosporins by methods applied in the synthesis of penicillins (J. Am. Chem. Soc. 84, 2983, 1962). If the $\gamma$-butyrolactone used as starting product contains an $NH_2$ or NH acyl group, cephalosporins are obtained directly by $\beta$-lactam ring closure, addition of the side-chain and possible splitting open of the lactone ring.

The $\alpha$-amino-$\beta$-acylthiomethyl butenolide to be used as starting product can also react in the tautomeric form, hence as imine derivative. If the starting product contains an OH group, the oxygen analogs of cephalosporins are obtained, or the oxygen atom of the heterocyclic 6-ring system may be replaced by a nitrogen atom in a certain stage of the synthesis, for instance by treatment with methyl iodide and subsequent treatment with ammonia.

The invention is further illustrated by the following examples:

EXAMPLE I

To 2.25 gm. of benzaldehyde are added, while stirring, 3.09 gm. of borotrifluoride-etherate. After standing for some time the ether formed is removed, after which the resulting precipitate is dissolved in 15 ml. of chloroform. To this solution are added 3.75 gm. of 3-hydroxy-4-acetylthiomethyl-2,5-dihydrofurane - 2 - one, dissolved in 10 ml. of chloroform. Next the mixture is stirred for 3 hours at room temperature, after which it is poured into 35 ml. of 2 N potassium hydroxide solution in water. The chloroform layer is separated, dried with magnesium sulphate and finally evaporated to dryness in vacuo. The residue is extracted with ether, after which there remains a residue insoluble in ether. This residue is dissolved in chloroform and after that recrystallised a few times from a mixture of ether and chloroform (2:1) in which the pure 2-phenyl-7-oxo-2,5-dihydro - 4H - furo[3,4-e]-1,3-oxathiine is obtained in a yield of 35%. Melting point 141–142° C.

In the same manner ring closure is effected by means of acetaldehyde, p-isopropyl-benzaldehyde, phthalimido-malonaldehydate t.butylester, o-chlorobenzaldehyde and p-chlorobenzaldehyde leading to the corresponding furo-oxathiines, in which in some cases instead of borotrifluoride another Lewis acid has been applied ($AlCl_3$ and $AsBr_3$).

EXAMPLE II

By the process described in Example I the $\alpha$-amino-$\beta$-acetyl-thiomethyl-butenolide has been converted into the corresponding 3,6-dihydro-(2H)-1,3-thiazine lactone derivative by means of $BF_3$-etherate and p-chlorobenzaldehyde.

A same ring closure can be obtained with the use of $AlBr_3$, $FeCl_3$ or $BF_3$ as Lewis acids in the reaction with propionaldehyde, p-isopropyl-benzaldehyde, phthalimido malonaldehydrate alkyl ester and benzaldehyde.

What is claimed is:
1. A compound of the formula:

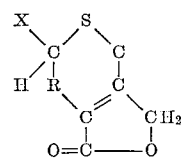

in which X is selected from the group consisting of lower alkyl, phenyl, lower alkylphenyl, chlorophenyl and an alkoxy carbonyl-phthalimido-methyl radical of the formula:

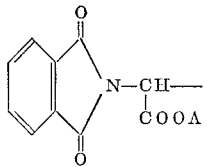

wherein A represents lower alkyl and R is selected from the group consisting of O, NH and N-lower alkanoyl.
2. A compound of the formula:

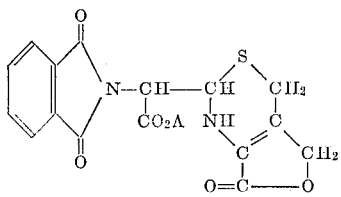

wherein A represents lower alkyl.
3. Process for the preparation of a heterocyclic organic compound, comprising reacting a compound of the formula:

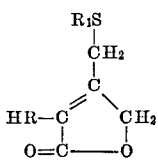

in which $R_1$ is lower alkanoyl and R is selected from the group consisting of O, NH and N-lower alkanoyl, with an aldehyde with the formula:

in the presence of a Lewis acid to form a compound of the formula:

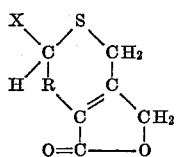

in which X is selected from the group consisting of lower alkyl, phenyl, lower alkylphenyl, chlorophenyl and an alkoxy carbonyl-phthalimido-methyl radical of the formula:

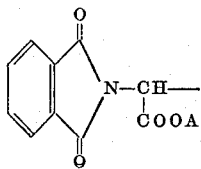

wherein A represents lower alkyl and R has the above meaning.

4. The process of claim 3 in which said aldehyde is a compound of the formula:

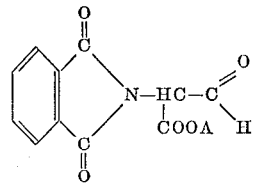

wherein A is a lower alkyl.

5. The process of claim 3 in which the Lewis acid is selected from the group consisting of $BF_3$ and $BF_3$-etherate.

References Cited

UNITED STATES PATENTS

| | | | |
|---|---|---|---|
| 3,218,318 | 11/1965 | Flynn | 260—243 |
| 3,268,523 | 8/1966 | Raap et al. | 260—243 |
| 3,396,159 | 8/1968 | Bernstein et al. | 260—243 XR |

OTHER REFERENCES

Sheehan et al.: Jour. Amer. Chem. Soc., vol. 81, pp. 3089–94 (1959).

JOHN D. RANDOLPH, Primary Examiner

J. M. FORD, Assistant Examiner

U.S. Cl. X.R.

260—327, 999